Jan. 23, 1951  F. F. FOSS  2,539,242
PICKING BELT AND HOOK ATTACHMENT
Filed July 1, 1947
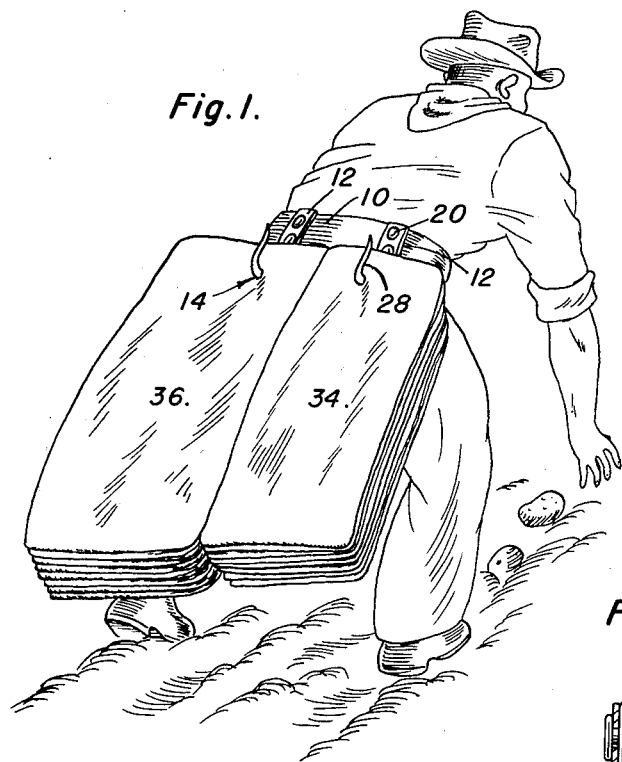
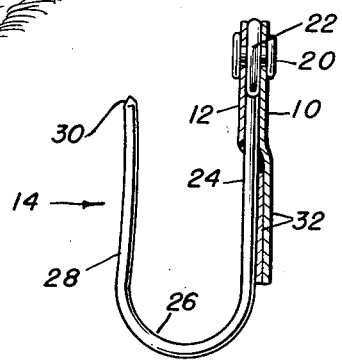
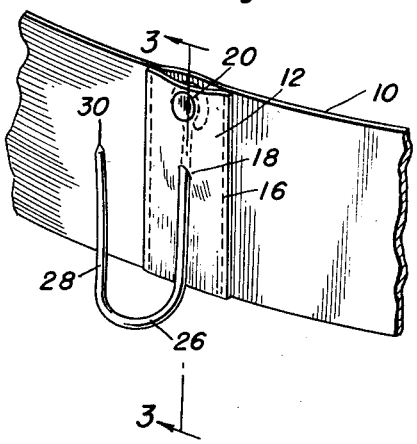
Inventor
Fred F. Foss
By *Clarence A. O'Brien and Harvey B. Jacobson*
Attorneys Patented Jan. 23, 1951

2,539,242

UNITED STATES PATENT OFFICE 2,539,242

PICKING BELT AND HOOK ATTACHMENT

Fred F. Foss, Twin Falls, Idaho

Application July 1, 1947, Serial No. 758,287

3 Claims. (Cl. 224—5)

This invention relates generally to belts, and more particularly to a picking belt and hook attachment comprising a belt securable about the waist of a person engaged in harvesting or picking potatoes and various other crops, the belt having hooks for suspending containers such as burlap bags which may be carried conveniently on these hooks secured to the rear portion of the belt while the person is engaged in such work.

This invention is an improvement on a picking belt patented December 25, 1928, and numbered 1,696,509. In brief, the improvement consists in the development of a more perfectly shaped hook and the means for securing this hook, usually in pairs, on said belt, the belt being also modified.

A primary object of this invention is to provide means for securing such a hook to a belt which will not weaken the hook, the hook having a simple turned portion or eye formed at one end of the shank portion thereof and adapted to receive a single large rivet or grommet inserted through the eye and through both layers of a double layered belt portion.

Another salient object of this invention is to provide a belt construction in which the belt is double layered and a portion of the hook shank and the eye on the end of this shank is inserted between the two layers, thus providing for maximum security of attachment, it being understood that the belt will be constructed ordinarily of heavy canvas or leather.

Still another object of this invention, ancillary to the foregoing object, is to mount a hook on a picking belt, so that a major portion of the shank portion of the hook extends exteriorly of both layers of the belt, thus forming a pad underneath the said major portion of the shank, and increasing the comfort wherewith the belt may be worn, without decreasing the security of attachment of the hook.

Still another object of this invention is to provide a hook in which the sharpened arm portion extends upwardly substantially to the level of the rivet or grommet securing the shank portion of the hook to the belt, and in which the arcuate portion between the shank portion and the sharpened arm portion of the hook extends immediately beneath and rearwardly of the lower edge of the belt, so that said hook does not contact the wearer.

And a last object to be specifically mentioned is to provide a device of this character which is relatively inexpensive and practicable to manufacture, extremely simple and convenient to use, and which will give generally efficient and durable service.

With these objects definitely in view, this invention resides in certain novel features of construction, combination and arrangement of parts and portions as will be hereinafter described in detail in the specification, particularly pointed out in the appended claims, and illustrated in the accompanying drawing which forms a material part of this application, and in which:

Figure 1 is a perspective view illustrating how this belt is worn and how the hooks are used to support empty bags in a convenient position;

Figure 2 is a perspective view, on a slightly enlarged scale, of a portion of the belt and a single hook mounted thereon; and Figure 3 is a vertical transverse sectional view, taken on the line 3—3 in Figure 2, to facilitate the illustration and to amplify the disclosure of this invention.

Referring now to the drawing in detail, it will be noted that the belt is comprised of two layers 10 and 12 of semi-flexible material such as heavy canvas or leather, the outer layer 12 being either coextensive with the inner layer 10 or extending throughout only minor portions of the length thereof as illustrated in the drawing. When the outer layer 12 is reduced as illustrated in the drawing, this outer layer may be considered as comprising local reinforcing portions or pads and it is considered unimportant in this application whether this outer layer 12 extends the full length of the belt or is provided only at the points of attachment of the hooks generally indicated by the numeral 14. The outer layer 12 will be secured to the inner layer 10 as by stitching indicated at 16.

The outer layer 12 is apertured as at 18, and both layers are apertured adjacent the upper edges thereof to receive rivets or grommets 20 used to secure the eye portion 22 of the hook between the two layers.

The hook includes a depending shank portion 24, an arcuate portion extending downwardly and outwardly as at 26 and an upstanding arm portion 28 which is sharpened at the upper end 30. It should be carefully noted that the hook is inserted through the aperture 18 in the outer layer 12 so that the eye portion 22 remains between the two layers and the lower portion of the shank 24 is disposed exteriorly of both layers so that the lower portions 32 of the two layers of the belt comprise the pad which greatly increases the comfort wherewith this belt may be worn when a quantity of empty bags 34 and 36 are suspended on the hooks, it being understood that normally two hooks 14 will be incorporated with the belt and that the nature and size of the bags 34 and 36 will determine the relative positioning of the two hooks on the belt.

It should be carefully noted that the arcuate portion 26 extends rearwardly of the belt beneath the lower edge thereof, so that when the bags 34 and 36 are hung on the hooks, the weight of the bags will not force the hook into uncomfortable contact with the body of the wearer.

The operation of this invention will be clearly understood from the foregoing description of the mechanical details thereof, taken in connection with the above recitation of the objects sought to be achieved by this invention, and it will be clear that these objects have been fully attained. In recapitulation, it should be noted that the method of attachment of the hook to the belt is such that the hook will not be readily torn from the belt even under conditions of arduous use and that maximum comfort for the user has been provided, all with the employment of a simplification of structure and a cheapening of the cost of manufacture.

Although there has been shown a particular embodiment of this invention, this application is not limited to this particular embodiment, but it is desired to include in the scope of this invention, the construction, combination and arrangement of parts and portions substantially as set forth in the appended claims.

Having described the invention, what is claimed as new is:

1. A picking belt and hook attachment comprising a belt securable about the waist of a person and having a plurality of layers of material, a generally U-shaped hook having an outwardly and upwardly extending sharp ended arm and a straight shank terminating in an eye, said eye and a portion of said shank being disposed between said layers and intermediate the ends of the belt, and said eye being secured to said layers adjacent the upper edge of the belt.

2. A picking belt and hook attachment comprising a belt securable about the waist of a person and having an elongated inner layer of material and a shorter layer of material secured to the outer side of the elongated layer, a generally U-shaped hook having an outwardly and upwardly extending sharp ended arm and a straight shank terminating in an eye, said eye and a portion of said shank being disposed between said layers and intermediate the ends of the belt, and said eye being secured to said layers adjacent the upper edge of the belt, the outer layer being apertured, and a major portion of said shank being disposed exteriorly of this outer layer and in abutment therewith, both of said layers thus constituting a pad under said major portion.

3. A picking belt and hook attachment comprising a belt securable about the waist of a person and having a plurality of layers of material, a generally U-shaped hook having an outwardly and upwardly extending sharp ended arm and a straight shank terminating in an eye, said eye and a portion of said shank being disposed between said layers and intermediate the ends of the belt, and said eye being secured to said layers adjacent the upper edge of the belt, the outer layer being apertured, and a major portion of said shank being disposed exteriorly of this outer layer and in abutment therewith, both of said layers thus constituting a pad under said major portion, an arcuate portion of said hook integral with and disposed between said shank and said arm extending outwardly from the lower edge of said belt so that said hook does not contact the wearer.

FRED F. FOSS.

REFERENCES CITED

The following references are of record in the file of this patent:

UNITED STATES PATENTS

| Number | Name | Date |
|---|---|---|
| 514,808 | Bertrand | Feb. 13, 1894 |
| 892,991 | Hepworth | July 14, 1908 |
| 1,271,554 | Fane | July 9, 1918 |
| 1,604,067 | Norris | Oct. 19, 1926 |
| 1,696,509 | Tresner | Dec. 25, 1928 |
| 1,736,131 | Reace et al. | Nov. 19, 1929 |
| 2,310,842 | Davitt et al. | Feb. 9, 1943 |